Dec. 8, 1925.
P. DELLB
CHAIN TIGHTENER
Filed April 2, 1925 2 Sheets-Sheet 1
1,564,537
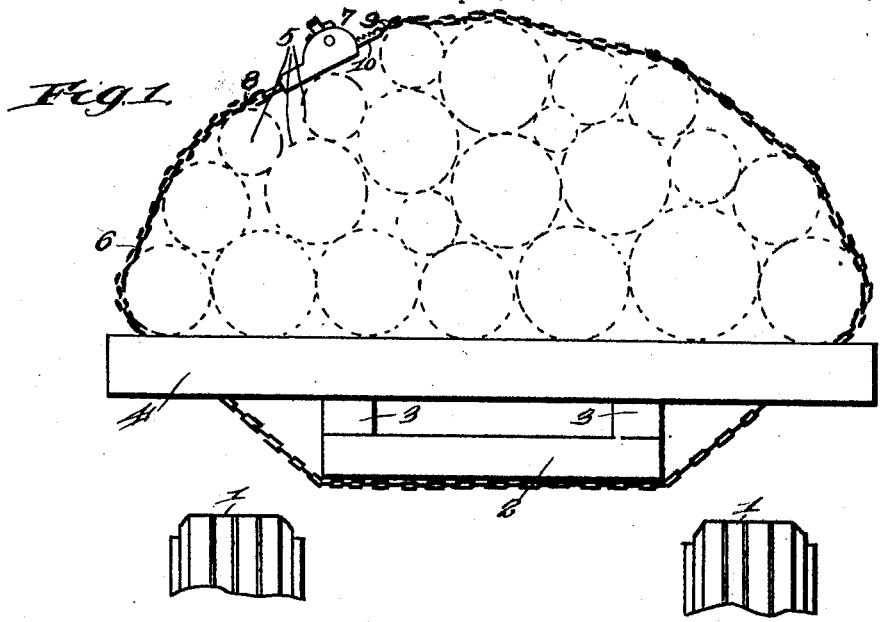
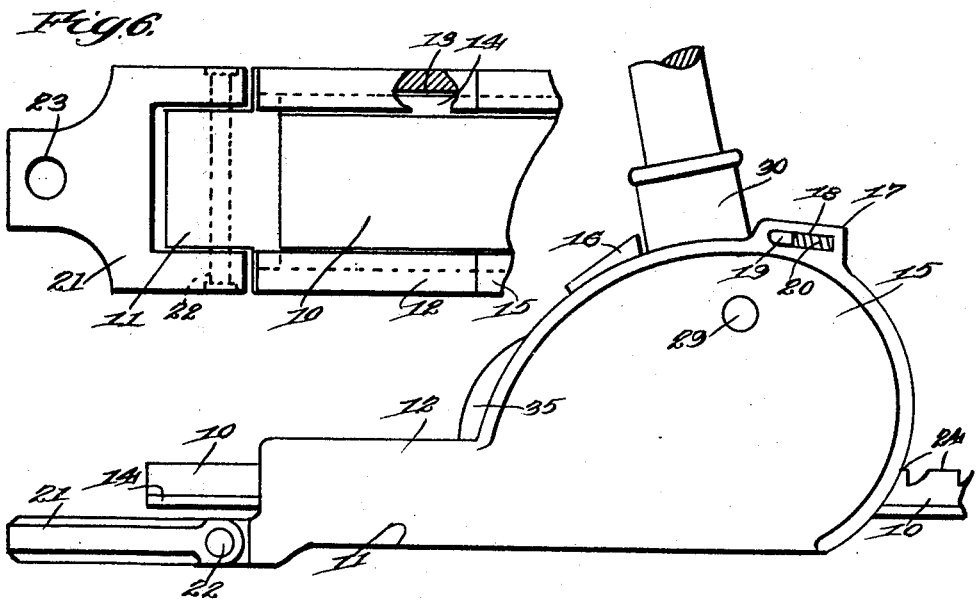
INVENTOR
Peter Dellb
BY
Carl N. Crawford
ATTORNEY Dec. 8, 1925.
P. DELLB
CHAIN TIGHTENER
Filed April 2, 1925    2 Sheets-Sheet 2
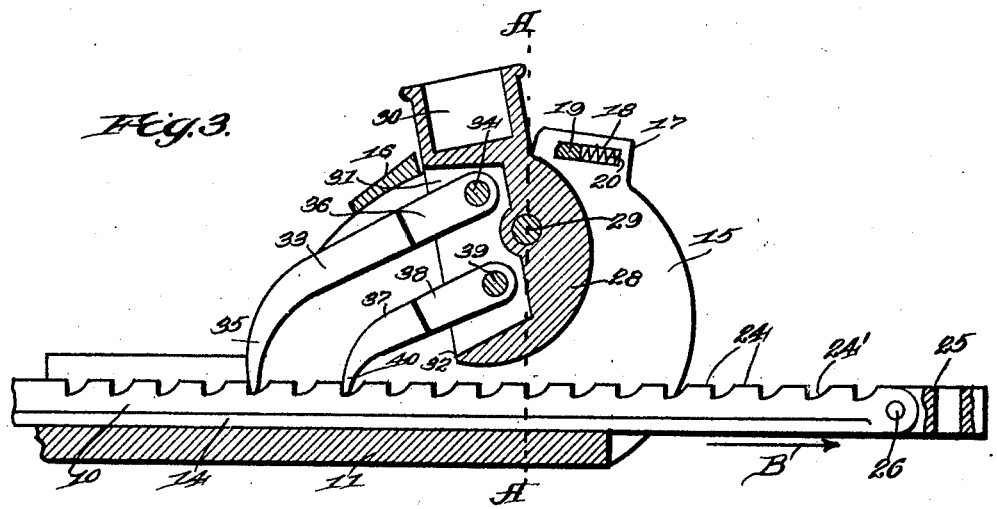
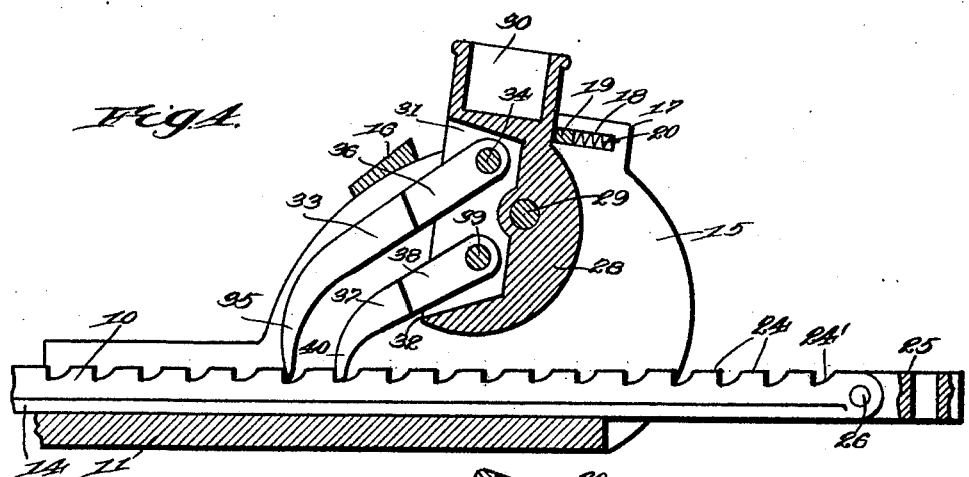
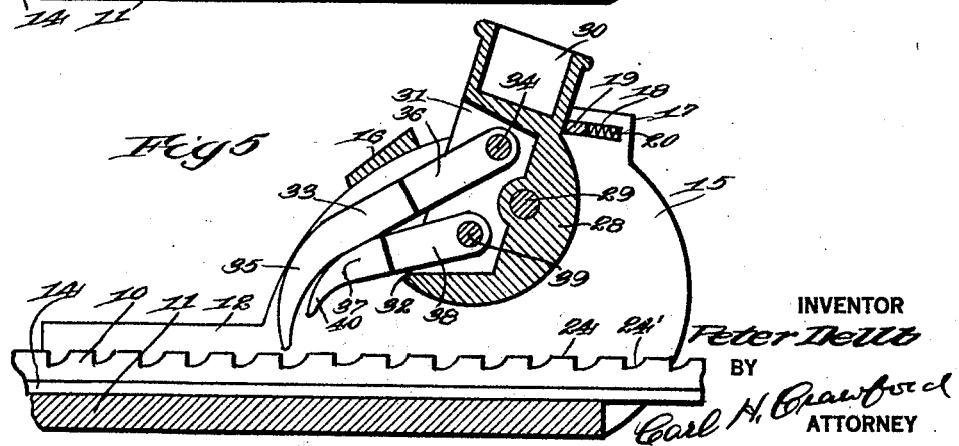
INVENTOR
Peter Dellb
BY
Carl H. Crawford
ATTORNEY Patented Dec. 8, 1925.

1,564,537

UNITED STATES PATENT OFFICE.

PETER DELLB, OF SPOKANE, WASHINGTON.

CHAIN TIGHTENER.

Application filed April 2, 1925. Serial No. 20,273.

*To all whom it may concern:*

Be it known that I, PETER DELLB, a citizen of the United States, residing at Spokane, in the county of Spokane and State of Washington, have invented new and useful Improvements in Chain Tighteners, of which the following is a specification.

The main object of this invention is to provide an efficient wrapper chain tightener and retainer for use in trucking logs, but the device of my invention is applicable to other uses of a similar nature.

When logs are loaded onto a truck that is in a position of rest, and the wrapper chains tightened as closely as possible, the driver starts the truck and the jars and jolts over rough roads, or even smooth roads, causes the logs to settle, and this settling of the logs produces slack in the chains. It is then necessary to stop and tighten the chains again, otherwise, a heavy log might slide forward when descending a grade, and do irreparable damage.

Now it is the object of my invention to provide an efficient tightener and retainer that can be quickly adjusted in the performance of its function of tightening the chain, and it is a feature to provide such a device that is not in any manner secured to the truck and which may be disposed under the latter or in any desired position on the logs.

A further feature consists in a device of this character comprising a rack bar and tightening pawls associated with a rock pawl block in such a novel manner that the pawls and block will coact to automatically lock and retain the chain in its tightened position, without any additional locking means.

A further feature consists in providing major and minor pawls adapted to advance the rack bar in each oscillating throw of the pawl block, and, in the preferred form the tightening advancing movement is imparted to a greater extent by one pawl than by the other.

A further novel feature consists in the provision of stops limiting the oscillating throw of the pawl block, and thereby limiting the number of rack bar teeth engaged by the pawls, in such a manner that irrespective of either extreme position which the block may occupy, still, the pawls will both be in engagement with rack teeth and will transmit thrust to said block in a manner to lock the rack bar.

My invention has many other objects and features which will be more fully described in connection with the accompanying drawings and which will be more particularly pointed out in and by the appended claims.

In the drawings:—

Fig. 1, is a rear view of a truck loaded with logs and showing the device of my invention applied thereto.

Fig. 2, is a view in side elevation of my improved tightener on an enlarged scale.

Fig. 3, is a vertical longitudinal sectional view of the same showing the pawl block in a forward position with both pawls in engagement with the rack bar.

Fig. 4, is a similar view showing the pawl block in a rearward position.

Fig. 5, is a similar view showing the pawl block tilted to such an abnormal position that both pawls are lifted out of engagement with the rack bar to release the latter.

Fig. 6, is a plan view of the left hand end of the device as shown in Fig. 2.

Like characters of reference designate similar parts throughout the different figures of the drawings.

As shown, 1 designates the rear truck wheels and 2 the truck frame on which latter are secured the usual stiffening longitudinal timbers 3 and the usual transverse bunks 4. The logs are shown at 5, and a wrapper chain at 6, which chain encircles the logs and truck frame. The tightener device is generally indicated at 7, and one end 8, of the chain 6, is secured to the body of said device 7, the other end 9, of the chain being connected with the rack bar 10. I have shown the tightener located on one sloping side of the log load but its location may be at any other point on the logs, or even under the truck, as neither the chain 6 nor the tightener is in any way secured to the truck.

I will next refer to the specific construction of the tightening device.

Said device includes a guide body of generally U-shaped cross section having a bottom wall 11 and side walls 12. The walls 12 are laterally grooved at 13, to accommodate flanges 14, on the rack bar 10, whereby the latter may slide longitudinally in the guide body but whereby it will be held therein to a predetermined line of travel. The side walls 12, extend upwardly at 15, to form bearing and stop supports. A fixed stop 16, extends across wall portions 15 and is preferably rigidly secured thereto. This stop functions to limit the throw of the pawl block, to be presently described, toward the left of Fig. 2. Said wall portions 15 have stop guides 17, provided with slots 18, in which a retractive or yieldable stop guide bar 19 is slidably disposed. Springs 20, normally hold said stop in the position shown in Fig. 2, but permit retraction of stop 19 to the position shown in Fig. 5, for the purpose of dis-engaging the pawls from the rack bar to release the latter, as will be later described. The guide body has chain connecting means on one end thereof which is shown in the form of a link 21, pivotally connected to said body by a pivot pin 22 and having an eye 23, for connection with one end of a chain.

The rack bar 10, is provided with teeth 24, on its upper face, as shown in Figs. 3 to 5. If desired, a pivoted link 25, secured to the bar by pivot 26, and having an eye 27, may be employed as a connection means for the remaining end of the chain to be tightened.

A pawl block is generally designated at 28, and the same is shown mounted to rock on a pin 29, journalled in the side walls 15, and in the position shown in Figs. 3 to 5, said pin 29 constitutes a horizontal rocking axis for said block 28. The upper end of said block 28 is provided with a lever socket 30, into which a suitable lever or stake, may be inserted to provide ample leverage to rock said block 28. The left hand face of said block 28, viewing Fig. 3, is hollowed out as indicated at 31 to accommodate pivotal connection of certain pawls, to said block. The lower portion 32, of said hollowed out block, forms a pawl lifting element, as will presently be described. In the arrangement of the stops shown, the primary working or tightening throw of the block is to the left of Fig. 3, and is the farthest movement from the vertical, as indicated by line A—A, which intersects the axis 29, of said block 28. The shortest movement from the vertical is shown in the adjustment illustrated in Fig. 4, wherein it will be seen that the block 28 is arrested after it has very slightly passed the vertical. The importance of this arrangement will be described in the operation of the tightener.

A major and relatively long pawl 33, is secured to block 28 by a pin 34, which is disposed above the rocking axis or pin 29, and broadly speaking, at one side of pin 29. The lower end of said pawl 33, is curved and tapered, as shown, for engagement with teeth 24. Said pawl is suitably reduced at 36, to permit its pivoted end to enter the hollow chamber 31. A relatively shorter or minor pawl 37, suitably reduced at 38, is shown pivoted by pin 39, to said block 28, below pin 29, or broadly speaking, on that side opposite pin 29 from which pawl 33 is pivoted. Said pins 34 and 39, are the same radial distance from pin 29, as shown. Pawl 37, is curved and tapered, as shown at 40, and as the teeth 24 are curved at 24' it will be clear that the pawls 33 and 37, can ride freely over teeth 24, when the bar 10, is shifted to the left of Fig. 3. It will be noted that the pawls 33 and 37 extend both in one direction from block 28 toward teeth 24, and that they are disposed in superposed relation to each other in their various working positions as shown in Figs. 3 and 4, and in their non-working position shown in Fig. 5, they are in superimposed relation.

I will next describe the operation of the improved tightener.

Assuming that a chain is to be tightened and the parts are in the position shown in Fig. 3, the block 28 will first be rocked to the Fig. 4, position and in this movement, pawl 37 will advance bar 10 slightly to the left as pawl 33 is being retracted to engage a new tooth to the right. It will be noted that when block 28 is rocked from the Fig. 3 to the Fig. 4, position, that pin 39 will have been swung upwardly away from rack bar 10, about pin 29 as a center, and hence, pawl 37, will move bar 10 very slightly. However, from the Fig. 4 position to the Fig. 3, position, pin 34 moves continuously toward bar 10, and consequently pawl 33 will impart a greater extent of tightening movement to bar 10 than does pawl 37. Thus if there is a very minute slack in the chain to be taken up, the block 28 can be left in the Fig. 4 position, wherein both pawls are under compressive stress which they impart to block 28 on opposite sides of pin 29, thereby effectively locking and retaining the bar 10. If there is a greater extent of slack to be taken up, the block 28 can be rocked to the Fig. 3, position. In this latter position the pawls are separated by one tooth, and they likewise impart stress to block 28 on points opposite pin 29. Thus, in either extreme position of block 28, the pawls coact therewith to lock and retain bar 10 in the position to which it has been adjusted. Arrow B, shows the direction of pull on bar 10 by the chain. From the Fig. 3, position it will be clear that I do not rely on stop 16, to hold block 28 in the position shown, as the pawls do this, however, the stops 16, and 19, limit the extent of throw of block 28 so that the pawls cannot be moved to a too great extent, or beyond the correct position in which to engage the teeth, with a minimum of slack. Thus, it will be seen that I have shown a slight space between the forward or left hand face of socket 30, and stop 16.

It will also be clear that at least one pawl will always be in engagement with a tooth of the rack in any event, and irrespective of the direction of throw of block 28, hence, in both right and left throws of blocks 28, the rack 10 will be advanced.

When it is desired to take off the chain, which must first be released as regards its tension, then, an abnormal thrust is imparted to the lever to overcome springs 20, and the block 28 is rocked into the position shown in Fig. 5. This causes the portion 32 to first lift pawl 37, and the latter to finally lift pawl 33, both out of engagement with teeth 24, then the tension on bar 10 is free to move the latter and render the chain slack.

It will now be clear that the block 28, is securely locked in either of the extreme positions shown in Figs. 3 and 4, to securely retain bar 10 in its adjusted position.

While I have shown and described one specific form of my invention, I do not wish to be limited thereto except for such limitations as the claims may import.

I claim:—

1. In a chain tightener, a guide body having chain connecting means, a rack bar slidable in said body and having chain connecting means, a pawl block pivoted to oscillate in said body, a set of pawls for coaction with the teeth of said rack bar and being pivoted to said block to be actuated thereby to advance said bar, a fixed stop on said body limiting rocking movement of said block in one direction, and a yielding stop normally limiting rocking movement of said block in a direction opposite to the first named direction and adapted to yield under abnormal pressure to actuate said pawls to free said rack bar.

2. In a device for taking up various degrees of slack in a chain or like device, a guide body, a rack bar slidable on said body, a pawl block pivoted to oscillate on said body, a set of pawls pivoted to said block on opposite sides of the pivotal axis of the block and coacting with said rack bar to actuate the latter on each oscillating movement of said block in both directions, a stop limiting movement of said block beyond effective tightening action of one pawl, and a stop limiting movement of said block in a direction opposite to the first named direction for limiting movement of said block beyond effective tightening action of the remaining pawl to limit the latter pawl to a reduced degree of tightening action with respect to the tightening action of the remaining pawl, whereby various degrees of slack in the chain may be taken up.

In testimony that I claim the foregoing as my own, I hereby affix my signature.

PETER DELLB.